INVENTORS
DONALD H. POLK
ALAN F. HAUGHT
BY Donald J. Bradley
ATTORNEY

United States Patent Office 3,513,409
Patented May 19, 1970

3,513,409
Q-SPOILING OF LASERS USING TWO DYE CELLS
Donald H. Polk, East Hartford, and Alan F. Haught, Glastonbury, Conn., assignors to United Aircraft Corporation, East Hartford, Conn., a corporation of Delaware
Filed Dec. 15, 1966, Ser. No. 601,884
Int. Cl. H01s 3/00
U.S. Cl. 331—94.5                    5 Claims

ABSTRACT OF THE DISCLOSURE

A laser in which two bleachable dye cells are inserted into the laser optical feedback cavity for Q-switching the laser, the shape and amplitude of the laser output pulses being controlled by adjusting the relative intensity of the dye concentration.

---

This invention relates to Q-switching of lasers, and particularly to the use of Q-spoiling or Q-switching apparatus inserted into the laser feedback cavity for generating high-power laser pulses. Specifically, this invention relates to the use of two bleachable dye cells inserted into the laser optical feedback cavity to produce unmodulated single, high-intensity laser pulses which may be controlled in amplitude and which may be shaped by adjusting the dye concentrations. Once the dye concentrations and other laser parameters are set for a particular type of pulse, the pulse can be reproduced up to about 50 times before degrading. Fresh dye solution is all that is required to restore the original pulse.

In laser systems currently in use, Q-spoiling to generate short-duration, high-intensity output pulses has been achieved with rotating mirror shutters, ultrasonic beam deflection, electro-optical shutters such as Kerr and Pockel cells, and bleachable dyes either as a dried film or in liquid solution. Ultrasonic beam deflection systems have yielded only relatively low power pulses. The prisms or other reflective optical elements in rotating mirror systems frequently suffer irreversible damage at high laser powers. Electro-optical devices gradually or catastrophically degrade in performance at high laser powers and are very costly to replace. Kerr cells, in particular, have been found to be generally unsatisfactory for laser powers in excess of 50–100 megawatts. Bleachable dye solution Q-spoiling, on the other hand, is very inexpensive compared with other techniques, and can be used repeatedly without degradation for laser powers in excess of several hundred megawatts.

In prior art systems employing bleachable dyes, a cell containing the dye solution is placed in one end of the laser optical cavity between the reflecting mirror and the laser element. The concentration and the thickness of the dye solution is adjusted to produce the desired laser output. These systems, however, are extremely critical with respect to dye concentration for fixed laser pumping energy, and it is difficult to obtain a single pulse of radiation. Generally a series of pulses is produced, and the pulses that are obtained are usually highly amplitude modulated or mode-locked. Apart from the requirements of a particular application, for which modulated pulses may be undesirable, the high peak powers obtained in highly modulated pulses can damage or destroy laser components even when the average pulse power is well below the damage threshold.

This invention avoids the difficulties of the prior art by inserting a second cell containing a bleachable dye solution in the laser optical feedback cavity.

It is therefore an object of this invention to generate a single, unmodulated high-intensity giant laser pulse.

Another object of this invention is a novel apparatus for generating reproducible short-duration, high-intensity laser pulses of identical peak power and energy.

A further object of this invention is a novel two-cell bleachable dye Q-switch for lasers.

A further object of this invention is a novel apparatus for adjusting the shape of a laser output pulse.

These and other objects of this invention may be more fully understood by referring to the following description and claims, read in conjunction with the accompanying drawings, in which:

Figure 2:
FIG. 2 shows the modulated laser pulses generally obtained using conventional bleachable dye Q-switching.

A common method of bleachable dye Q-switching involves the use of a single cell filled with a saturable dye solution, the cell being placed in the optical feedback cavity of the laser. Acceptable pulses have been obtained with ruby lasers using a dye solution, but the pulses are not reproducible for more than five or six laser shots. More generally a series of pulses are obtained. Furthermore, the dye concentration and the pumping lamp energy required to obtain acceptable pulses are very critical. Unless both the dye concentration and the lamp energy are correct, the laser pulse is highly modulated as shown in FIG. 2, and the peak power of the modulations can be sufficient to destroy or damage the mirrors and other optical elements in the optical cavity even when the average pulse power is relatively low.

Figure 1:
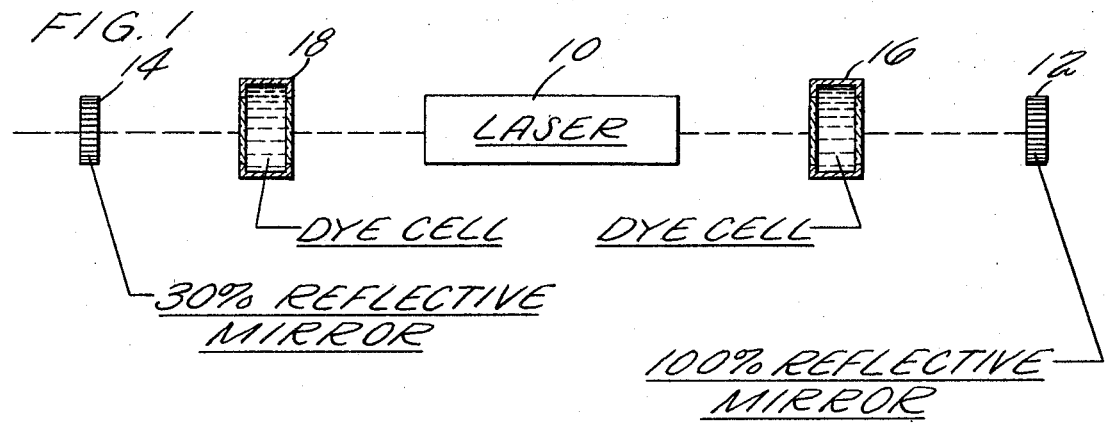
FIG. 1 shows schematically a laser system incorporating this invention.

FIG. 1 shows schematically a technique for eliminating the difficulties encountered with the single dye cell laser Q-switches. This technique consists of requiring the laser beam to traverse a bleachable dye solution at each end of the optical cavity. This is conveniently effected by placing a cell containing a solution of the appropriate dye in each end of the laser cavity between the laser medium and the end reflector mirror.

Referring to FIG. 1, a laser medium 10 such as a ruby laser having a peak power of 500 megawatts is contained in a feedback cavity comprising reflective mirrors 12 and 14. Mirror 12 is essentially 100% reflective, while mirror 14, through which the laser output is directed, may be 30% reflective. A first optical cell 16 containing an appropriate dye solution is positioned between laser medium 10 and mirror 12, and a second optical cell 18 is positioned between laser medium 10 and mirror 14. Conventional laser pumping apparatus including a flash lamp and power supply are not shown.

Cells 16 and 18 may be commercially available cell having an optical cavity through which the laser output may be transmitted, and the cells contain a dye solution. For ruby lasers the dye solution may be, for example, vandyl phthalocyanine in chloroform, vandyl phthalocyanine in nitrobenzene, or cryptocyanine in methanol. Other suitable dyes may exist, but it appears than only dyes with recovery times of the same order as those for phthalocyanine or cryptocyanine will yield unmodulated pulses. Dyes with very much shorter recovery times produce modulated or mode-locked pulses even with the two-cell configuration.

The dye solution placed in the cell 16 at the high reflection end of the laser cavity is adjusted so that the output from the laser system consists of two to four short duration pulses. Dye is then added to cell 18 at the output end of the laser cavity until its concentration is such that all but one of the laser pulses is suppressed. By further adjustment of the dye concentrations and the laser pumping energy, extremely fast rise pulses of 5 nanoseconds halfwidth (full width at half maximum power) have been obtained, with routine operation at pulse halfwidths of 10 to 30 nanoseconds. These pulses contain little or no modulation, and peak power outputs in excess of 500 megawatts and pulse energies up to 6 joules have been obtained.

Typically the length of the optical path within the dye in each cell is one centimeter. For this path length, the dye concentration is such as to produce 50% to 80% transmission at the laser wavelength.

Although this invention has been described as using a ruby laser, it is apparent that any type of laser may be used provided a dye appropriate for the particular laser exists.

The dye concentration in the cell 18 is generally similar to that in cell 16, but neither the absolute or relative concentrations are critical. By variation of the absolute and relative dye concentrations and of the pumping lamp energy, the rise time, pulse width and peak power of the laser output pulse can be adjusted to obtain a variety of pulses. Typical pulses which have been obtained vary from 30 nanosecond rise time, 30 nanosecond halfwidth, and 100 megawatt peak power to approximately a 5 nanosecond rise time, 5 nanosecond halfwidth, and 500 megawatt peak power. Once set, the pulses are reproducible for up to 50 successive laser shots, and when the pulse shape begins to degenerate, it can be easily restored by replacing the used dye with fresh solution.

Figure 3A:
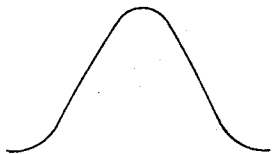
FIGS. 3A, 3B and 3C show various waveshapes produced by the laser system of FIG. 1.
Figure 3B:
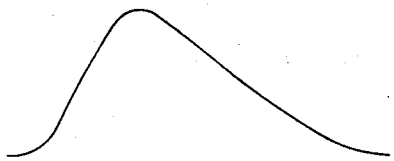
Figure 3C:
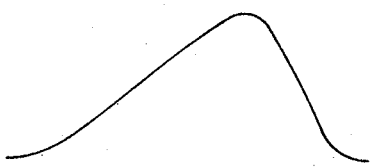

FIG. 3 shows how the laser pulses may be shaped by adjusting the absolute and relative dye concentrations in the two cells. A specific pulse for any given laser can be produced by a wide variation of dye concentrations depending on the other laser parameters, but for any given laser the required concentrations may be quickly and easily established by experiment. For example, FIG. 3A shows a symmetric pulse which has been obtained when the dye concentration in cells 16 and 18 is properly adjusted. For some dyes the symmetric pulse is produced when the dye concentration in both cells is equal. For the same laser, having the dye in cell 18 at a higher concentration than that in cell 16, produces a pulse having a fast rise and slower fall, as shown in FIG. 3B. Alternatively, with the dye concentrations higher in cell 16, the pulse has a slow rise and fast fall, as shown in FIG. 3C.

The apparatus described represents an improvement over the existing state of the art. First, the production of single, high-intensity giant pulses is not a critical function of the dye concentration. Up to 50 short-duration extremely high-intensity pulses of essentially the same peak power and energy may be obtained before replacement of the dye solution is necessary. Simply replacing the dye is all that is necessary for a second set of about 50 pulses, in contrast to single dye cell operation for which continuous adjustment of the dye concentration is required and reproducible outputs are rarely obtained. Secondly, the modulation and mode-locking usually obtained with a single dye cell is not present with the two-cell configuration. By an appropriate adjustment of the dye concentrations in the cells of the two-cell configuration, one, two or three pulses can be obtained as desired during each shot, and each pulse is smooth with no high frequency modulation. Furthermore, all pulses, whether in successive shots for single pulses or during one shot for multiple pulses, are of the same shape with the peak power and energy differing by no more than a small fraction. Thirdly, by adjustment of the absolute and relative dye concentrations in the two cells, the pulse may be shaped to have fast rise, small width and high power, or slow rise and large width with somewhat lower power.

Although this invention has been described in terms of the preferred embodiment, it is obvious that changes may be made by those skilled in the art without departing from the scope of this invention as hereinafter claimed.

We claim:
1. Apparatus for isolating a single laser pulse and controlling the shape and amplitude thereof comprising
    a continuous active laser medium,
    first and second reflective mirrors spaced respectively from opposite ends of said laser medium to form an optical feedback cavity therebetween,
    a first optical cell containing a bleachable dye positioned in said optical feedback cavity between said laser medium and said first mirror,
    and a second optical cell containing a bleachable dye positioned in said optical feedback cavity between said laser medium and said second mirror.
2. Apparatus as in claim 1 in which the concentration of bleachable dye in one of said optical cells is different from the concentration in the other said cell.
3. Apparatus as in claim 2, in which the concentration of the bleachable dye in said first optical cell is higher relative to the concentration of the bleachable dye in said second optical cell, whereby the waveform of the output pulse from said laser medium has a relatively slow rise time and a relatively fast fall time.
4. Apparatus as in claim 2 in which the concentration of the bleachable dye in said second optical cell is higher relative to the concentration of the bleachable dye in said first optical cell, whereby the waveform of the output pulse from said laser medium has a relatively fast rise time and a relatively slow fall time.
5. Apparatus as in claim 1 in which the length of the optical path in each of said cells is approximately one centimeter, and the dye concentration in each said cell is such as to produce a transmission of said laser output through each said cell of between 50% and 80% in the non-bleached state at the wavelength of said laser output.

References Cited

UNITED STATES PATENTS 3,289,099   2/1963   Masters _____ 331—94.5

OTHER REFERENCES

"Giant Pulse Laser Operation by a Passive, Reversibly Bleachable Absorber," B. H. Soffer: J. Appl.-Phys., vol. 35, No. 8, August 1964.

DONALD L. WIBERT, Primary Examiner

C. CLARK, Assistant Examiner

U.S. Cl. X.R.

350—160